United States Patent
Donnelly et al.

(10) Patent No.: US 6,809,762 B1
(45) Date of Patent: Oct. 26, 2004

(54) MULTIPLE PHOTOGRAPH SERVICE METHOD AND APPARATUS

(76) Inventors: Brett James Donnelly, P.O. Box 3932, Vero Beach, FL (US) 32964; Barbara Goode Robinson, P.O. Box 3932, Vero Beach, FL (US) 32964

( * ) Notice: Subject to any disclaimer, the term of this patent is extended or adjusted under 35 U.S.C. 154(b) by 0 days.

(21) Appl. No.: 09/918,605

(22) Filed: Jul. 31, 2001

Related U.S. Application Data

(60) Provisional application No. 60/268,210, filed on Feb. 12, 2001, and provisional application No. 60/263,167, filed on Jan. 22, 2001.

(51) Int. Cl.$^7$ .............................. H04N 5/76; H04N 5/225
(52) U.S. Cl. ..................................... 348/231.7; 386/117
(58) Field of Search ................................. 348/231, 232, 348/233, 373, 584, 231.1, 231.7, 231.8, 231.9; 386/46, 117; 705/26, 27

(56) References Cited

U.S. PATENT DOCUMENTS

| | | | | |
|---|---|---|---|---|
| 5,345,313 A | * | 9/1994 | Blank | 348/584 |
| 5,508,774 A | | 4/1996 | Klees | 354/266 |
| 5,576,838 A | | 11/1996 | Renie | 386/117 |
| 5,587,740 A | * | 12/1996 | Brennan | 348/373 |
| 5,655,053 A | * | 8/1997 | Renie | 386/117 |
| 5,694,514 A | | 12/1997 | Evans et al. | 386/46 |
| 5,809,520 A | * | 9/1998 | Edwards et al. | 348/233 |
| 5,946,444 A | | 8/1999 | Evans et al. | 386/46 |
| 6,167,469 A | * | 12/2000 | Safai et al. | 348/231 |
| 6,324,521 B1 | * | 11/2001 | Shiota et al. | 705/27 |

* cited by examiner

Primary Examiner—Wendy R. Garber
Assistant Examiner—Luong T. Nguyen
(74) Attorney, Agent, or Firm—Young & Basile, PC

(57) ABSTRACT

A photograph service method offers a package to a customer containing a selected number of photographs to be taken at a plurality of individual photographic sites within a defined geographic area. Payment for the package is arranged for and accepted in advance. The paid customer is provided with a customer I.D. or uniquely identified at each photographic site where images are captured. The images are then processed and delivered to the customer. Each customer is provided with a digital media storage element for transport to each photographic site. Images are captured at each of the photographic sites using the digital media storage element.

10 Claims, 2 Drawing Sheets

MULTIPLE PHOTOGRAPH SERVICE METHOD AND APPARATUS

CROSS-REFERENCE TO CO-PENDING APPLICATION

This application claims the benefit of the priority filing date of U.S. Provisional Patent Application Ser. No. 60/263,167, filed Jan. 22, 2001, and the U.S. Provisional Patent Application Ser. No. 60/268,210, filed Feb. 12, 2001.

BACKGROUND

One way people often capture memories of vacations is by taking photos of themselves at a vacation spot, such as a resort, amusement park, etc. At numerous amusement parks and other vacation locations, it is common for families or individuals to buy photographs taken of themselves at various sites in the particular vacation location by a professional photographer at each location, both to have a better photograph taken of themselves as well as to eliminate the need and hassle of carrying a camera and taking photographs themselves or asking a stranger at a particular location to take the picture of the entire family or individuals.

Many amusement parks across the country automatically take pictures of each individual on a given ride as the ride passes a given point. These pictures are displayed for perusal by the individuals at the completion of the ride and may be purchased.

However, both photographic selling techniques rely on a "shoot and hope" technique where the photographs are taken or the photographer made available at a given location in hope that individuals will purchase photographs taken at the particular location. It is believed that improvements could be made to such photographic services to increase profits for the photographer.

SUMMARY OF THE INVENTION

The present invention is a photograph service method. The method includes the steps of offering a photograph package to a customer containing a selected number of photographs to be taken or images captured at a plurality of individual photographic sites; arranging for and accepting payment for the photographic package, identifying a prepaid customer at each photographic site, taking photographs or images at a plurality of photographic sites, and delivering the photographs or images to the customer.

Preferably, the issued customer I.D. is input and validated at each photographic site prior to taking a photograph.

In another aspect of the invention, the method includes the issuance of a digital media storage element to each customer. The storage element is used at each photographic site for taking a digital photograph. The digital media storage element is then removed from the digital camera at each photographic site and carried by the customer to the next site. At the completion of the predetermined time period or the number of preselected photographs in the package, the digital media storage element is returned for processing of the stored digital images which are then printed and delivered to the customer.

The photograph service method of the present invention affords many opportunities and advantages over previous "shoot and hope" techniques employed by photographers in amusement parks, national parks, etc. By use of the present method, more photographs are sold to the customer by having the customer select and pay for a photographic package in advance. This also not only increases the number of photographs which are taken and paid for, but frees the customer from having to make decisions as to whether they should or should not have a photograph taken at a particular site during their travels. Preselection of the photographs simplifies the photograph process, both for the photographer and the customer.

The present method is also advantageously used with digital media storage elements which are usable in digital cameras to take and store digital images. The storage element can be issued to each customer and then carried by each customer from photographic site to photographic site. In this manner, the digital media storage element, when returned to the main photograph center at the completion of the package, need only be processed. The digital media storage element also enables the customer to view the taken photograph at each photographic site and/or at the completion of the photograph package to determine whether or not they approve any given photograph. When reviewed at each photograph site, if the customer does not like the photograph which was taken, a new photograph can be easily and quickly retaken.

BRIEF DESCRIPTION OF THE DRAWING

The various features, advantages and other uses of the present invention will become more apparent by referring to the following detailed description and draw in which.

DETAILED DESCRIPTION

The present multiple photograph service method is based on the concept of offering at least one package containing a predetermined number of photographs or images, i.e., one or more, of an individual, family, traveling group, all hereafter referred to as a "family", at different locations or sites in a defined area, such as an amusement park(s), beach, resort, or any other area or multiple areas in which activity takes place.

The inventive photographic service may contain one or more packages each offering a different number of photographs of the family at one or more photograph sites. The packages may also be based on a given number of photographs, one or all of which can be taken at the same photograph site.

The term "photograph site" as used herein means a location in a resort, amusement park, etc., where a photographer is assigned to take photographs of individuals or families registered in the present photograph service program.

The term "photograph" means an image stored on a photographic medium or in digital media.

The present method provides a preselected and prepaid photographic package which enables the family, once registered, to merely enjoy themselves at the vacation site and these appear at their leisure and on their own time schedule at a particular photograph site and have their picture taken. It is up to the family to determine if they will have all of the selected number of package photographs actually taken. This provides the family with the option of planning their daily schedule as they desire and not particularly worry about having to take photographs at a particular photographic site until they arrive at that site.

Figure 2:
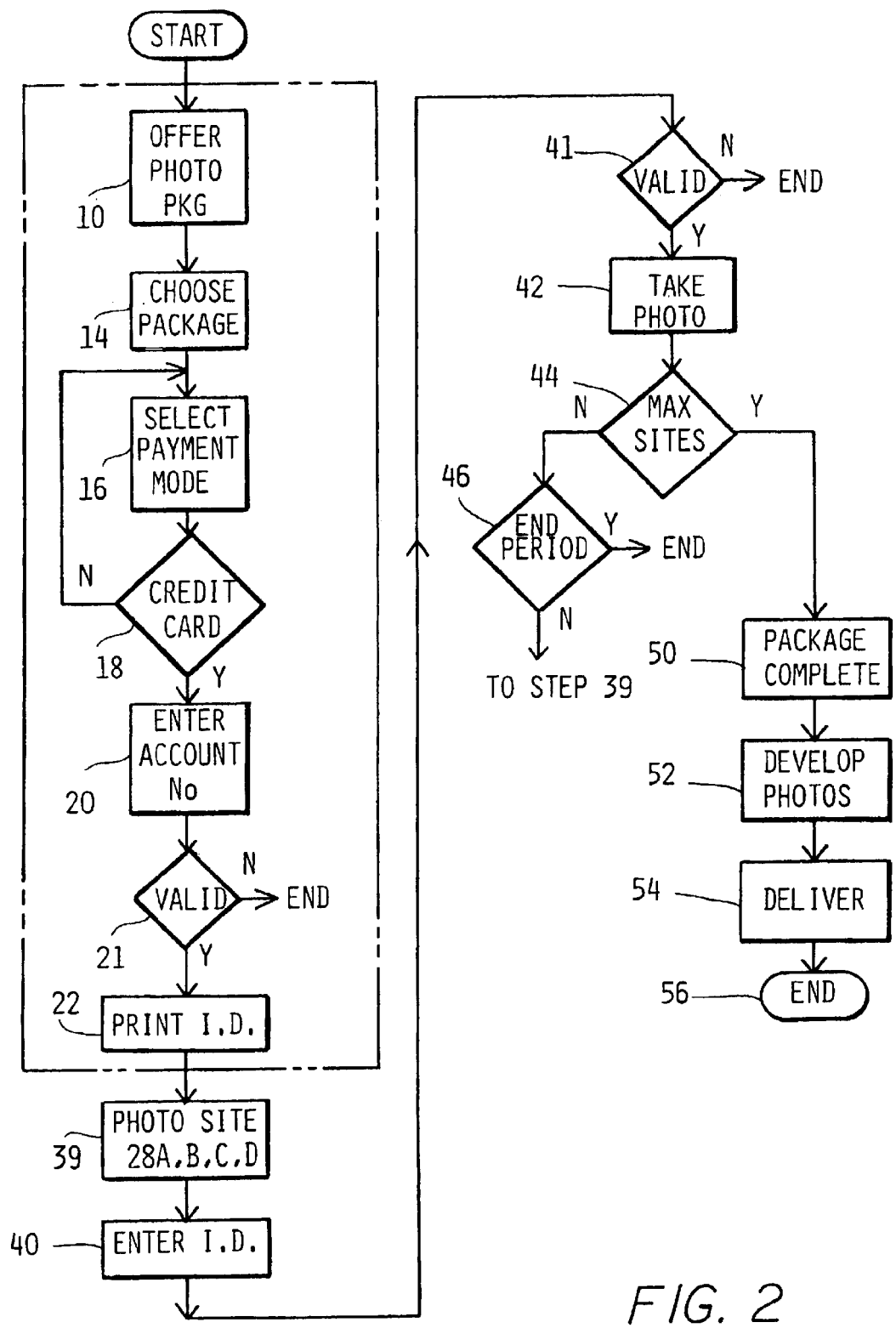
FIG. 2 is a flow diagram depicting the sequence of operation of the present method.

As shown in FIG. 2, the first step in the present method is to provide an offer of the details of a multiple photo package. This offer may be made in a variety of locations, either at the vacation site, such as at the resort, amusement park, etc., or off-site at a travel agent's office 25, via the Internet, or by telephone to the vacation site.

Figure 1:
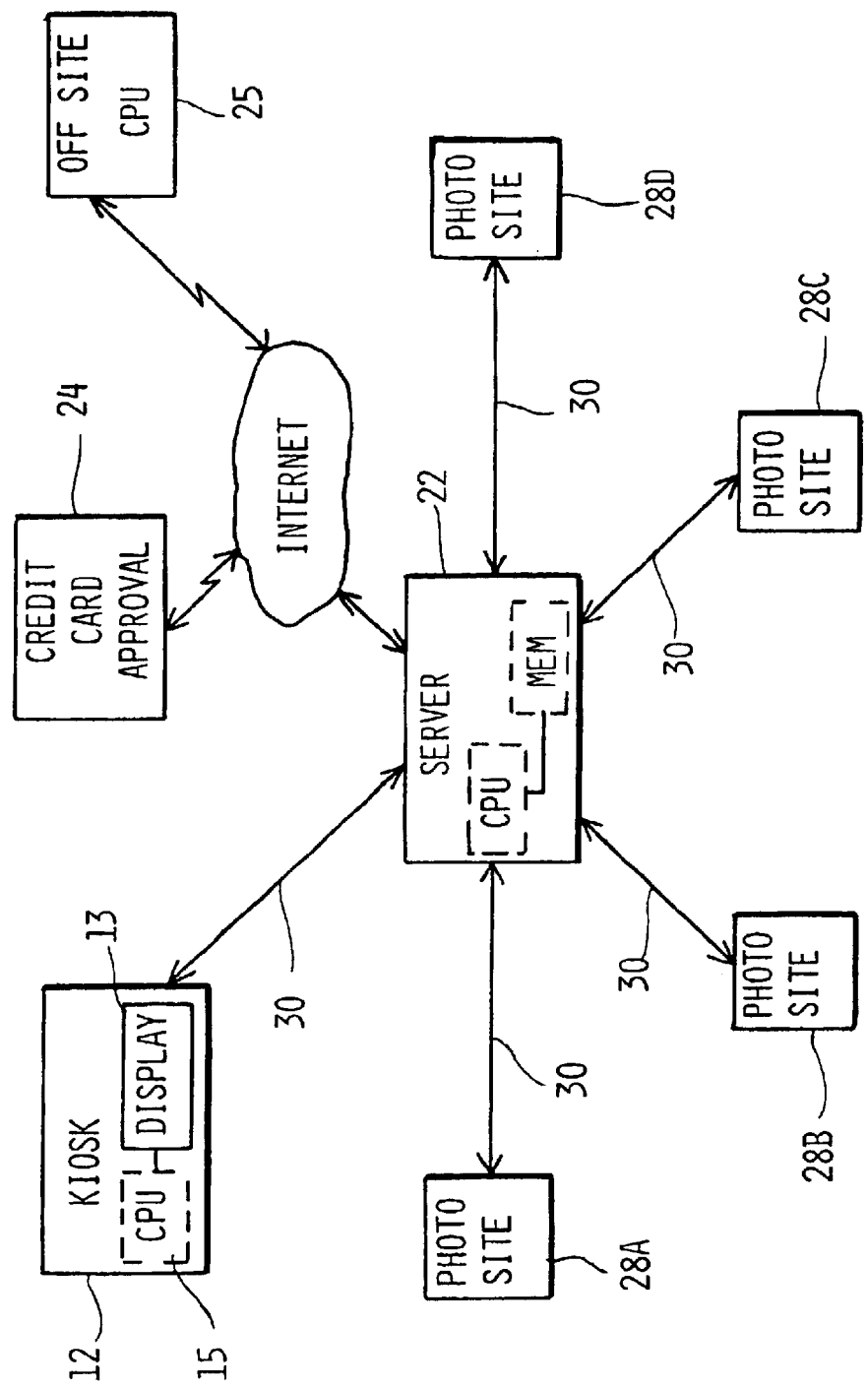
FIG. 1 is a block diagram of the major elements of the method of the present invention.

In an exemplary embodiment, the photo package details and package offerings in step 10 are provided at a kiosk 12 shown pictorially in FIG. 1 which can be located at the entrance of the vacation site. The kiosk 12 preferably includes a display terminal having a separate input means, such as a separate keyboard, or touch screen capabilities. The control program stored in the CPU 15 controlling the operation of the remote terminal in the kiosk 12, once activated, will provide introductory details about the photographic package offerings, such as the cost for each package or packages, the number of photographs in each package, the location of each photographic site covered by each package, with or without a sample photograph at each site, photograph delivery options, and an optional total time period for use of the package. The end result is that a family can select one particular package, including delivery options, etc., and then pre-pay for the package.

Specifically, the display terminal 13 in the kiosk 12 includes a touch screen on the terminal 13 allowing the family to select a particular photographic package. In step 16, the mode of payment is selected. Preferably, a credit card is employed as shown in step 18. It will be understood that the term "credit card," as used herein, is meant to encompass credit cards, debit cards, or any other electronic commerce type payment media including prepaid cards, electronic cash, etc. Cash could also be used as the payment method using ATM-type terminals.

In another prepaid option, not discussed above, the photographic package selection steps and payment may be incorporated into part of the overall vacation package selected and paid for, either partially via an advance deposit or fully in advance, by a family. Thus, when the family is selecting the dates of stay at a particular vacation site, as well as accommodations, food packages, cost and payment modes, the photographic package may also be selected and its price added to the lodging, food, entry fees which form part of the total vacation package.

The term "prepaid," as used with this invention, will also be understood to mean a payment for a digital media storage device, described hereafter, such as a Sony Memory Stick or Kodak Flash Card, which is capable of storing multiple digital photographic images. The family or customer can pay a set purchase price for the digital media storage device which may or may not include the cost of developing or printing all of the photographs which are subsequently taken and stored on the storage device.

"Prepaid" also means, within the content of the invention, a deposit for rental or use of the digital media storage device and, after the photographs are taken, return the storage device. The customer then pays only for the photographs taken or only the photographs that the customer chooses. Payment for the photographs can be deducted from the deposit or paid separate from the deposit which is returned to the customer.

Optionally, the prepaid package price may include payment for a digital media storage device which the customer or family keeps for separate processing by the family into photographs.

Referring back to FIG. 2, after the credit card payment mode has been selected in step 18, the credit card account number is entered in step 20. The credit card account number is entered by swiping the card through a conventional card reader in the kiosk 12 or by a manual input of the card number via a touch screen of the terminal 13.

The terminal 13 will verify validity of the entered credit card account number by a conventional credit card verification process through telephone lines, or via the Internet through connection, again, by wireless, hard conductor line, through a server or main CPU, and the Internet or a global communication network to the credit card approval agency 24, see FIG. 1.

Once the credit card payment is approved in step 21 and charged to the credit card account number entered in step 20, the terminal 13 prints a package ID in step 22. This ID will identify the family and the particular photographic package which will enable the family to have a predetermined number of photographs taken at various photographic sites within a defined area. Such information can be coded or uncoded. A bar code, magnetic strip, etc., may be employed on a tag or other I.D. media, such as a card, payment receipt, badge, etc., for ease of reading, scanning or viewwing at the individual photographic site.

As shown in FIG. 2, steps 10, 14, 16, 18, 20, and 22 all take place at the kiosk 12 in a preferred exemplary embodiment of the present invention. As shown in FIG. 1, and described briefly above, the terminal 13 and CPU 15 are linked to a server or main CPU 22 which contains a memory, as well as data communication links to the CPU 15, each of a plurality of photograph sites 28A, 28B, 28C, 28D, the credit card approval authority 24, etc. The data links 30 may be hard telephone line, electrical conductors, radio frequency transmission or wireless communication, including communication over a global communication network, such as the Internet 32 via Internet service providers, not shown.

The server or main CPU 22 controls the entire multiple photograph service method and apparatus of the present invention by linking data input through the terminal 13 and CPU 15 to a record stored in the memory of the main CPU 22 as well as identifying data from the customer I.D. at each photograph site 28A–28D when a particular family has a photograph taken at one of the photograph sites 28A–28D.

A particular family, which has paid for a photograph package according to the present invention, may undertake any activity they choose at the vacation site until they eventually arrive at one of the photograph sites 28A–28D or otherwise be identified at each site. The family need only present their ID which is scanned, read or input in step 40 by a photographer or other individual at a particular photograph site 28A–28D. Once the ID is verified in step 41, the photographer takes the photograph of the family in step 42. It will be understood that the family may have photographs taken at the site locations 28A–28D in any order, not necessarily in one particular preset order, and may skip an entire site by choice, error or otherwise, without interfering with the operation and completion of the photograph service package of the present invention.

Although the above-described implementation of the present invention describes the use of an actual photographer at each remote photograph site 28A–28D, it is also possible according to the present invention to have photos taken at each remote photograph site 28A–28D by an automatic photo machine. Such a machine will have a card scanner or reader or an input screen which is capable of receiving the customer ID information from the card or via a touch screen input in step 40. This will activate the CPU controlled video display on the automatic photo machine which will then provide a visual display or voice prompts of instructions for the customer or family to assume a predetermined position to have a photo taken.

The camera in such an automatic photo taking machine may be any suitable camera, such a low light, or a fast motion or with auto focus, with indoor/outdoor capability, bright light controls, etc.

It is also possible to provide the automatic photo machine with the ability to automatically display each taken photograph. This will provide the customer with the ability to approve or disapprove the photo. If a particular photo is disapproved, the photo machine will automatically sequence to take a new photo until customer approval is indicated by a touch screen or pushbutton input.

Once the photograph is taken at one of the sites 28A–28D, information about the I.D., photo site, etc., is transmitted from the site to the server 22. In the case of digital images, the digital images themselves can be transmitted to the server 22. The server 22 maintains a current record of each photograph taken for each package of a particular family. In step 44, the CPU in the server 22 makes a determination whether the maximum number of photographs have been taken at the photograph sites 28A–28D in the photograph package selected by the family. If the answer is no, the CPU then determines in step 46 whether the optional time period of the selected photograph package has expired. This time period can be selected as part of the initial package input data and may range from one day to multiple days, such as 2–7, for example, 7 days, depending upon the nature of the vacation site, the familys' vacation plans and/or schedule. If the selected package time period is not over, control returns to step 39 and awaits the family to arrive at one of the other sites 28A–28D for another photograph at which steps 40, 42, 44 and 46 are repeated.

When the maximum number of photographs have been taken in accordance with the selected photographic package as determined in step 44, or the selected package time period has expired in step 46, control in the CPU of the server 22 transfers to a determination of whether the selected package has expired or been completed. The CPU 22 will then invalidate further use of the selected package ID for a particular family thereby preventing excess or unpaid for photographs being taken. If a particular family were to appear at a photograph site 28A–28D for another photograph which is not covered by the preselected package, the entered family ID in step 22 will not be validated thereby prohibiting a photograph from being taken at the site.

Of course, an option can be provided in this situation to allow a family to change their minds and pay for additional photographs, beyond the number of photographs in the initially selected, prepaid package, by providing a payment input capability in the photograph site input device allowing an extra charge to be applied to the previously entered credit card account number or additional payment received from the family.

Once the package is determined to have expired in step 50, the CPU 22 provides an indication that it is okay to develop and/or print each of the photographs of the particular family taken at each site 28a–28d. This occurs in step 52. The negatives are processed in a conventional manner, through normal photographic film processing, or by digital printing, etc. The number of prints, the sizes of prints, whether in a photograph format or digital print, are provided as part of the initial photographic package selection which is preselected by a particular family. In step 54, the preselected delivery options of the photograph package are implemented. An album which may contain the name of the vacation site, the family name, the dates of stay at the vacation site, if selected as part of the initial package, as well as the photographs, are then sent to the home address of the family according to the preselected delivery instructions, such as regular mail, express mail, etc., and/or digitally via electronic mail, disc, etc.

At this point in step 56, implementation of the multiple photograph service method of the present invention ends.

Another feature of the present invention is the use in the prepaid photographic package of a digital storage media device or element, such as a Kodak Flash Card, or a Memory Stick or a CD-R, both sold by Sony.

The family merely carries the digital storage element with them and then inserts or has the storage element inserted into a digital camera at the photographic site or directly into an automatic photograph machine. The customer I.D. may be digitally stored in the storage element, along with other appropriate information, such as the selected photographic package, the number of photographs taken and/or purchased, etc. The storage element may be provided with a lanyard or other holder for easy portability. The customer I.D. may also be a unique digital media carrying, for example, the vacation site logo.

In the above-described method, when a digital storage memory device is employed, the customer, upon reaching a photographic site in step 39, merely inserts or has the storage element inserted into the digital camera. This automatically causes the customer I.D. on the storage element to be entered in step 40, and then validated in step 41. The photographer at each site can also visually identify a valid media.

The appropriate digital photograph is then taken in step 42, as described above. The family then removes the storage element and carries it with them to the next photographic site.

In step 44, where determination of the maximum number of pre-selected photographic sites is made, the user, with a digital image storage element, may decide to have additional photographs taken. This can be easily done on the storage element and an additional charge paid at the time of processing of the photographs, or when the customer returns the digital storage element.

At each photographic site 28A, 28B, etc., or at the completion of the maximum number of photograph sites where all of the preselected number of photographs have been taken, the customer may view the taken photograph in the digital camera and decide whether or not he/she/they like it. If the photograph is not acceptable, the photograph can be retaken at the photographic site.

The use of a digital media storage element also enables the taken photographs to be processed into actual printed photographs in step 52 by transmitting the digital information on the storage element to an appropriate printer at the kiosk 12, or remotely in a main processing center. In this manner, the prepared photographs can be delivered directly to the customer at the kiosk 12 or delivered by the delivery option preselected by the customer.

The multiple photograph service method of the present invention provides an opportunity for a photograph company to increase profits by ensuring that a selected number of photographs of an individual, family or other group at a particular vacation location or site are preselected and prepaid. This eliminates the "shoot and hope" procedure previously followed at vacation sites as well as maximizing the number of photographs for which payment is received in advance.

The above implementation of the multiple photograph service method of the present invention utilizes a central control for controlling the flow of customer data, tracking photographs, selecting photograph packages and photograph delivery as well as credit card payment. It will be understood that the present method may also be implemented manually without a central control. Specifically, steps 10–22 can be manually implemented by an attendant at the kiosk 12, or by a travel agent, etc. Credit card payment account information can be validated by commonly available credit card telephone validation procedures. Further, the printed ID can be a simple ticket with pull off tabs for each photograph to be taken at any selected photograph site, or punch out areas on a single ticket, etc.

Further, manual implementation of the present inventive method can also rely on simple handwritten or other documentation to correlate photographs taken at any of the photograph sites 28A–28D with the photograph negatives. Manual completion of the selected photo album as well as delivery of the photographs via the appropriate delivery medium selected by the customer can also be implemented.

What is claimed is:

1. A photograph service method comprising the steps of:
   offering a photograph package to a customer containing a selected number of photographs to be taken at a plurality of individual photographic sites within a defined area;
   arranging for and accepting payment from the customer for the photographic package;
   identifying a prepaid customer at each photographic site;
   issuing a portable digital image storage element to the customer for use in a digital camera at each photographic site by the identified customer;
   transporting the portable digital image storage element by the customer to a plurality of the photographic sites;
   inserting the portable digital image storage element into a digital camera at each photographic site;
   taking at least one image at the one of the plurality of photographic sites by the customer using the digital camera at the photographic site;
   storing the at least one image taken at the at least one of the photographic sites in the digital image storage element;
   the customer transporting the portable digital image storage element away from the one photographic site after the image is stored in the portable digital image storage element; and
   transferring the images from the digital image storage element to the customer.

2. The method of claim 1 further comprising the steps of:
   identifying a prepaid customer by issuing a unique customer I.D. to each prepaid customer; and
   determining the customer I.D. at each site where a photograph is to be taken.

3. The method of claim 2 further comprising the step of:
   automatically reading the customer I.D. at each site where a photograph is to be taken.

4. The method of claim 2 further comprising:
   validating the customer I.D. at each photographic site.

5. The method of claim 1 wherein the step of offering a photographic package further includes the steps of:
   providing a central processing unit in data communication with a first data input device to allow a customer to automatically select a one photograph package from a plurality of discrete photograph packages;
   providing a plurality of data input devices at each of the plurality of photograph sites for input of the customer I.D.

6. The method of claim 1 wherein the steps of taking at least one of photographic sites and the step of transporting further comprise the steps of:
   carrying the digital image storage element between the plurality of photographic sites; and
   taking at least one photograph at more than one of the plurality of photographic sites using a camera at each of the plurality of photographic sites for receiving the digital image storage element.

7. The method of claim 2 wherein the step of issuing the customer I.D. further comprises the step of:
   storing the customer I.D. on the digital image storage element.

8. The method of claim 1 wherein the photograph package offered to the customer further includes at least one of the cost of the package, the number of photographs in the package, the location of each photographic site covered by the package, and photograph delivery mode.

9. The method of claim 2 wherein the step of issuing the customer I.D. occurs after payment from the customer has been accepted.

10. The method of claim 1 further comprising the steps of:
    enabling at least one additional photograph beyond the selected number of photographs in the package to be taken at a photographic site; and
    arranging for and accepting payment for the additional photograph.

* * * * *